Figure 1:
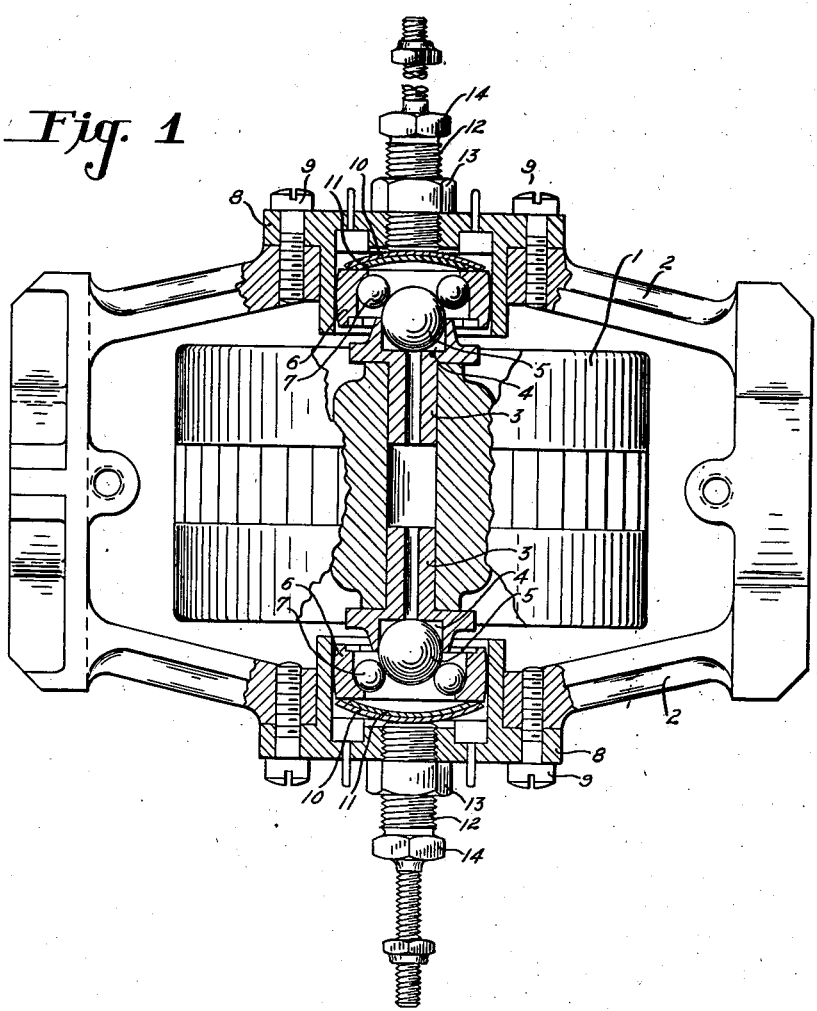

June 27, 1944.   B. G. CARLSON   2,352,469
SELF-ALIGNING AND TEMPERATURE COMPENSATING ROTOR BEARING ASSEMBLY
Filed Nov. 2, 1942   2 Sheets-Sheet 2

INVENTOR.
BERT G CARLSON
BY
ATTORNEY

Patented June 27, 1944

2,352,469

UNITED STATES PATENT OFFICE 2,352,469

SELF-ALIGNING AND TEMPERATURE COMPENSATING ROTOR BEARING ASSEMBLY

Bert G. Carlson, Erieside, Ohio, assignor to Jack & Heintz, Inc., Bedford, Ohio, a corporation of Ohio Application November 2, 1942, Serial No. 464,264

2 Claims. (Cl. 308—233)

This invention relates in general to rotors and more particularly to a new and novel method and means for mounting a gyroscope rotor within its bearings and for providing self-alignment and temperature compensation so as to maintain the correct freedom between the rotor and its bearings over a wide range of temperature variations.

In high precision instruments involving high speed rotors such as are found in gyroscopes, one of the greater problems has been to avoid binding or end play between the gyroscope rotor axle and its bearings because of the unequal coefficients of expansion of the parts of the assembly and the consequent failure to maintain constant bearing clearances between the rotor axle and its bearings. The conventional practice has been to bevel the two ends of the rotor pivot and to construct the rotor bearing to consist of a ball bearing race assembly which is resiliently urged into engagement with the conical bearing surface of the pivot.

It is therefore one of the primary objects of my invention to provide a new and novel means and method of insuring self-alignment and for predeterminedly compensating for temperature conditions and variations and in accomplishing this object I propose to provide the upper and lower extremities of the rotor pivot with a steel ball as the surface of the pivot to be engaged by its respective bearing assembly which may comprise ball bearings held in a race having a slightly spherical exterior so that the bearing assemblies are self-aligning with respect to the rotor pivot ball tips that they engage. I further propose to retain the bearing assemblies in such pivot engaging relationship by adjustment devices for clamping bimetallic members into clamped pressure abutment with the bearing races for purposes of temperature compensation so as to maintain constant bearing clearances and thus eliminate binding and end play between the rotor axle and its bearings and to also insure such freedom of operation of the rotor about its axis over a wide range of temperatures.

Accordingly, by my proposed method and means, and regardless of the coefficients of expansion of the rotor axle, bearing clearances between the rotor axle, or pivot, and its bearings are maintained constant and consequently binding or end play between the bearings and the rotor axle is eliminated. So far as the clearances between the rotor end pivot balls and their bearings, carried by their supporting gimbal or rotor housing, are concerned, any tendency of the assembly to contract or expand under low or high temperature conditions is compensated for by the bowed bimetallic clip with its outer portion of copper and its inner portion of steel interposed between the bearing race and the bearing support and clamping adjustment device.

Figure 2:
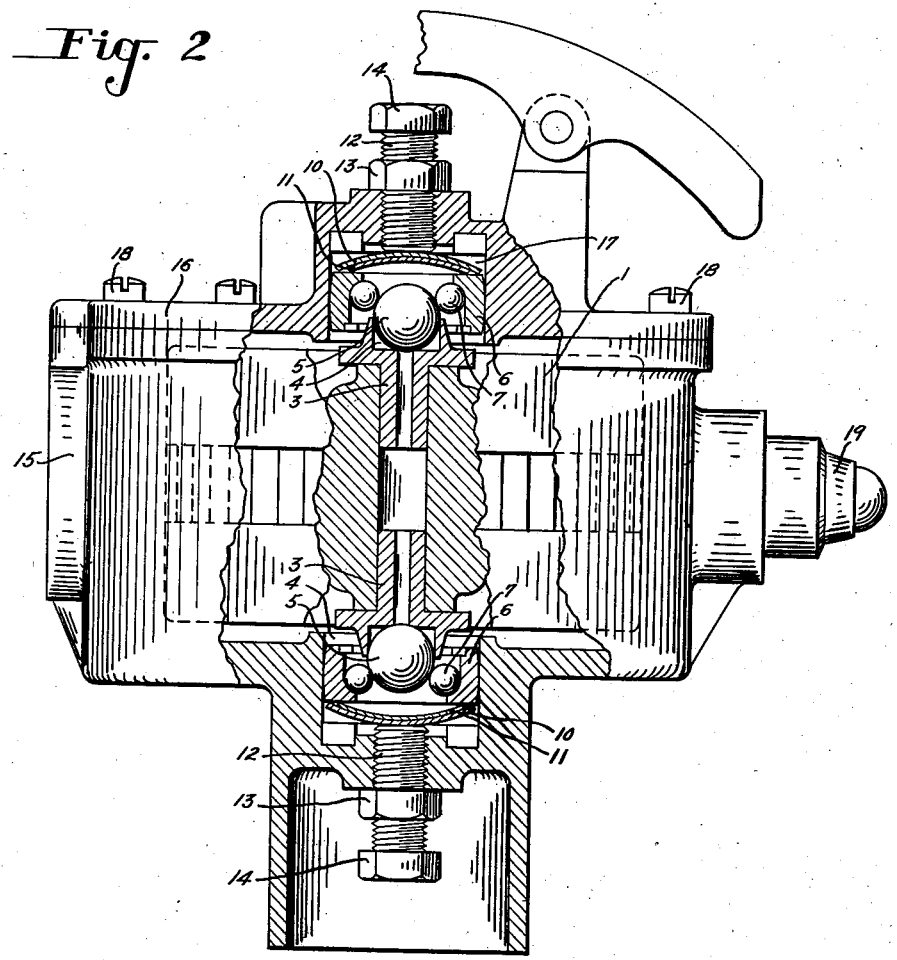

With the foregoing and other objects in view, my invention resides in the new and novel method and means and in the combination of parts and details of construction set forth in the following specification and appended claims, certain embodiments thereof being illustrated in the accompanying drawings, in which:

Figure 1 is a top plan view partly in section through a horizontal axis directional gyroscope rotor assembly and its supporting gimbal frame and also showing the rotor axle and bearing assemblies; and Figure 2 is a similar view of a vertical axis horizon gyroscope rotor assembly.

Referring more particularly to the drawings, it should be understood that so far as the present invention is concerned and so far as it is applicable to horizon and directional gyroscopic rotor assemblies as will be described as two embodiments of my invention, only those parts of the rotor, its bearings, gimbals and housing that have any definite relation to my invention necessitate any detailed description.

With this in mind and in connection with the directional gyro, as shown in plan view in Figure 1, the gyro rotor 1 rotates about a horizontal axis in bearing assemblies carried by a supporting gimbal frame 2. As is conventional practice, the gimbal frame is pivotally supported in the usual manner in the vehicle adapted to carry it so as to permit oscillation about a horizontal axis at right angles to that of the rotor.

Each of the two rotor pivots comprises a barrel 3 with a cup-shaped extremity 4 into which is preferably press fitted a steel ball 5 so as to rotate with the rotor. The bearing assemblies each include a race 6 and balls 7 carried by a housing 8 that is releasably secured by screws 9 to the gimbal frame 2 that supports it. Resting on the outer surface of each ball race is an outwardly bowed bimetallic clip, or disc, the outer layer 10 of which is preferably copper and the inner layer 11 steel. An adjustment screw bolt 12, nut 13 and lock nut 14 are provided so that the bolt 12 when turned in the bearing housing 8 forms the means for clamping the ball bearings 7 against the pivot ball 5 in predetermined proper pressure engagement through the slightly resilient medium of the bimetallic element 10, 11.

The advantageous self-aligning feature of the invention is brought about by the fact that the ball bearings 7, instead of bearing against the conventional conical pivot tip, are in constant engagement with a ball 5, which assembly more readily assures self-alignment. A further means of insuring self-alignment, without the attending creeping of the ball bearings, is provided by the forming of the outer surfaces of the ball races slightly convex, or spherical, as shown in the drawings. This permits slight rotation of the race as the ball bearings ride on the pivot ball to compensate for slight misalignment that might otherwise occur in the rapid rotation of the rotor.

The temperature compensation feature of the invention is provided for by the interposition of the bimetallic thermostatic element 10, 11 between the pivot ball and bearing assembly of steel and the bearing housing and gimbal of magnesium, inasmuch as the inner layer of lesser area is of steel and the outer layer of greater area is of copper.

In Figure 2 there is shown in elevation, partly in vertical section, the invention as applied to a vertical axis horizon gyro rotor assembly, wherein the rotor 1 is provided with the usual casing 15 in which the rotor rotates. In this case the casing constitutes the support for the rotor in that the casing supports the bearing assemblies 6, 7 for the rotor pivot and which rotor pivots 3, 4, 5 and bearing assemblies 6, 7 are the same as those described in connection with the directional gyro shown in Figure 1. In assembling the horizon gyro rotor of Figure 2, the same is inserted in the rotor casing 15 with the pivot ball tip 5 in engagement with the ball bearings 7 and the bimetallic copper and steel element 10, 11 in engagement with the ball race 6 and adjustment screw bolt 12. The casing is provided with a top plate 16 including a bearing housing 17 to receive the upper bearing assembly, bimetallic element and adjustment screw bolt. This top plate, with this assembly, is then releasably secured by screws 18 to the casing and the entire assembly adjusted, with respect to bearing clearances. The casing is provided with the usual trunnions 19 for rotation about a transverse horizontal axis in the usual gimbal frame, not shown. By this arrangement and adjustment the same degree of insurance of self-alignment of bearings and temperature compensation for constant bearing clearances over a predetermined wide range of temperature conditions is obtained as discussed in connection with the directional gyro assembly of Figure 1.

From the foregoing it will be seen that there has been provided a ball pivot and bearing assembly that will automatically compensate for temperature variations over a wide range due to the bimetallic thermostatic self-alignment of the ball bearings and bearing race with respect to the pivot so as to maintain constant bearing clearances.

I claim:

1. In combination in a gyro rotor assembly, a rotor provided with axial pivots about which it rotates having press fitted steel ball extremities, ball bearing assemblies in engagement with said pivot ball extremities and supports for said ball bearing assemblies to rotate therewith, resilient bimetallic thermostatic members stationarily mounted in said ball bearing assembly supports to bear against the races of said ball bearings for urging said ball bearings inwardly into engagement with said pivot ball extremities, exterior means bearing directly on said bimetallic members for adjusting the compression of said bimetallic members for forcing said ball bearings inwardly against said pivot ball extremities for predeterminedly adjusting and constantly maintaining constant the bearing clearances therebetween over a range of temperature changes.

2. In combination in a gyro rotor assembly, a rotor provided with axial pivots about which it rotates having press fitted steel ball extremities, ball bearing assemblies in engagement with said pivot ball extremities and supports for said ball bearing assemblies to rotate therewith, resilient bimetallic thermostatic members stationarily mounted in said ball bearing assembly supports to bear against the races of said ball bearings for urging said ball bearings inwardly into engagement with said pivot ball extremities, exterior means bearing directly on said bimetallic members for adjusting the compression of said bimetallic members for forcing said ball bearings inwardly against said pivot ball extremities for predeterminedly adjusting and constantly maintaining constant the bearing clearances therebetween over a range of temperature changes, the outer surfaces of said ball bearing races being slightly spherical to permit slight rotation thereof in their supports for automatic self-alignment of the ball bearings with respect to the pivot ball extremities.

BERT G. CARLSON.